Jan. 30, 1968    L. J. PRENNER ET AL    3,365,753
TIE DEVICE
Filed Sept. 16, 1966    3 Sheets-Sheet 1
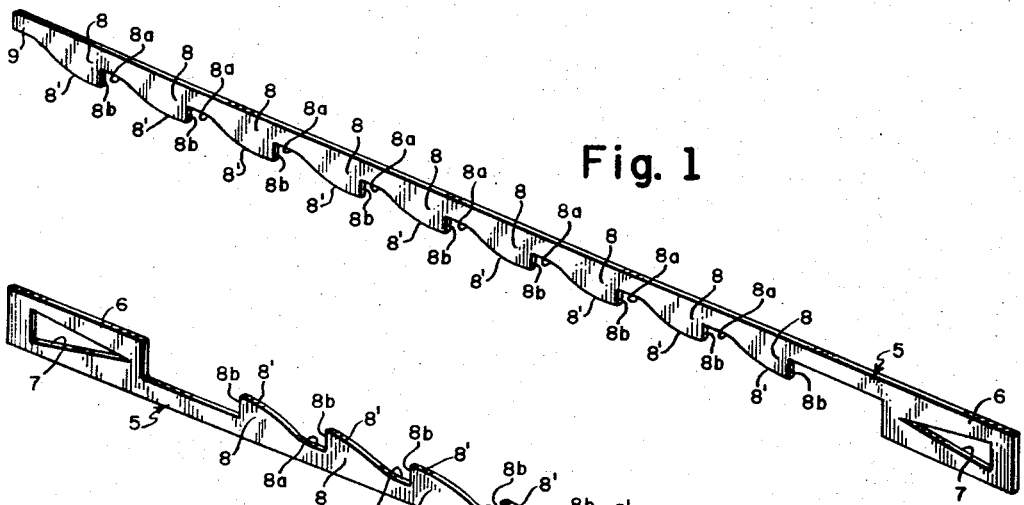
Fig. 1
Fig. 2
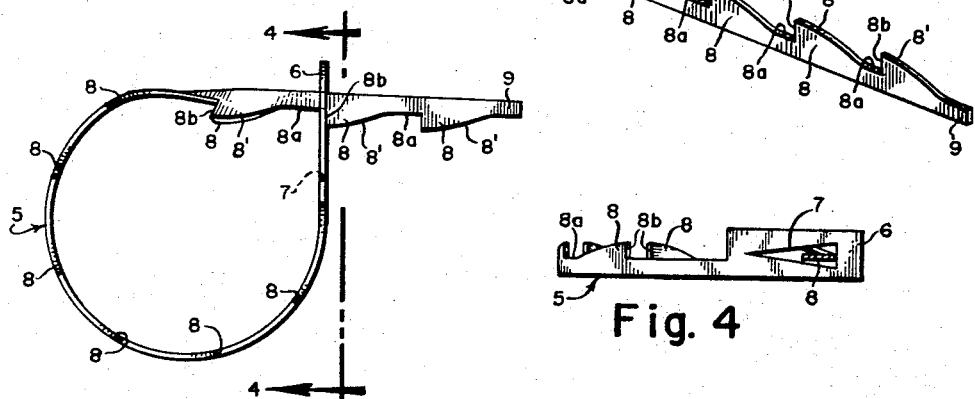
Fig. 3
Fig. 4
Fig. 5
Fig. 6
Fig. 7
INVENTORS.
LOUIS J. PRENNER
MILTON PRENNER
BY James H. Gyles
ATTORNEY

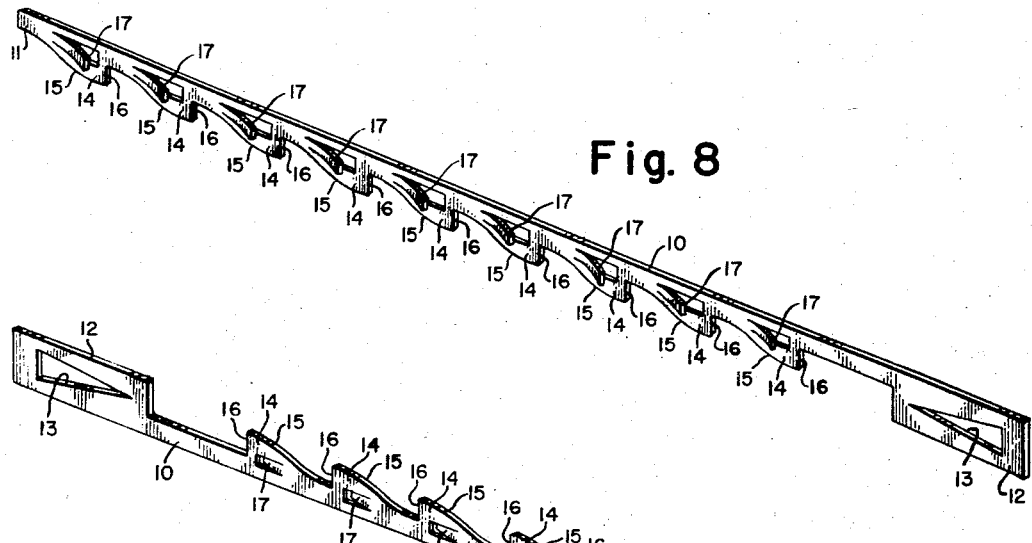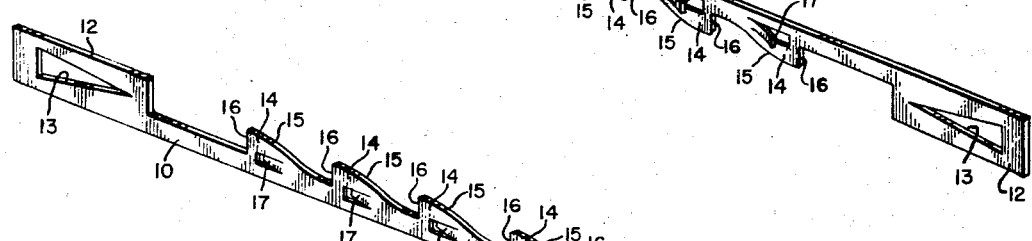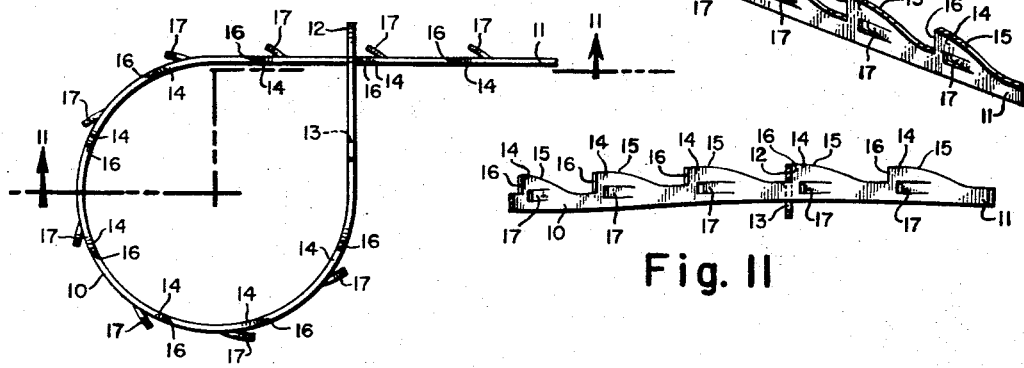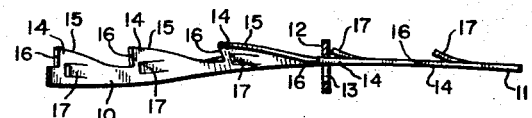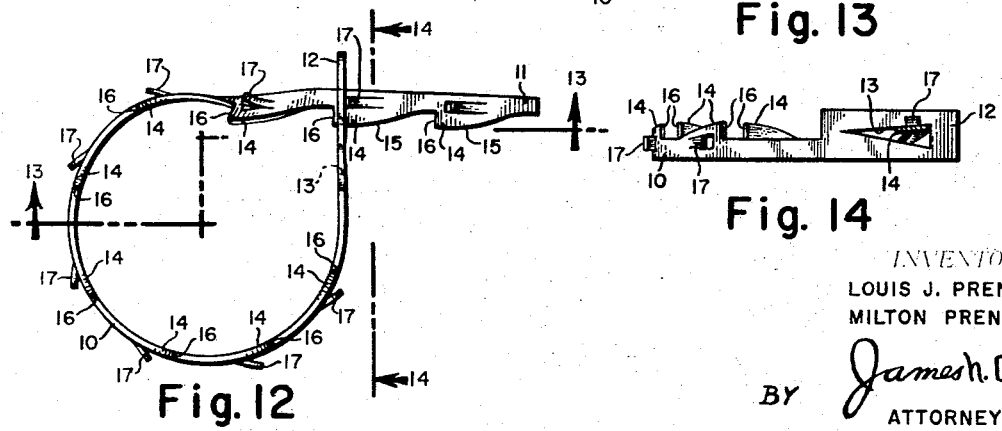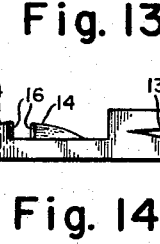

INVENTORS.
LOUIS J. PRENNER
MILTON PRENNER

BY James N. Cyles
ATTORNEY

United States Patent Office 3,365,753
Patented Jan. 30, 1968

3,365,753
TIE DEVICE
Louis J. Prenner and Milton Prenner, both of
P.O. Box 1446, Pompano Beach, Fla. 33061
Filed Sept. 16, 1966, Ser. No. 580,008
2 Claims. (Cl. 24—16)

ABSTRACT OF THE DISCLOSURE

A tie device that is particularly adapted to be looped around growing plants, pipes, conduits or other articles, the device consisting of a flat, lengthy, flexible plastic strap having a V-shaped opening adjacent to one of its ends and provided with a plurality of teeth along one of its longitudinal edges. Each tooth forms a shoulder and has a curved edge that tapers from the shoulder toward the end of the strap that is remote from the opening. Located between the teeth are narrow tongue portions of uniform width and which facilitate the twisting of the strap when and after it is inserted through the opening. The invention also contemplates the provision of laterally extending tongues formed on or out of the teeth.

Figure 15:
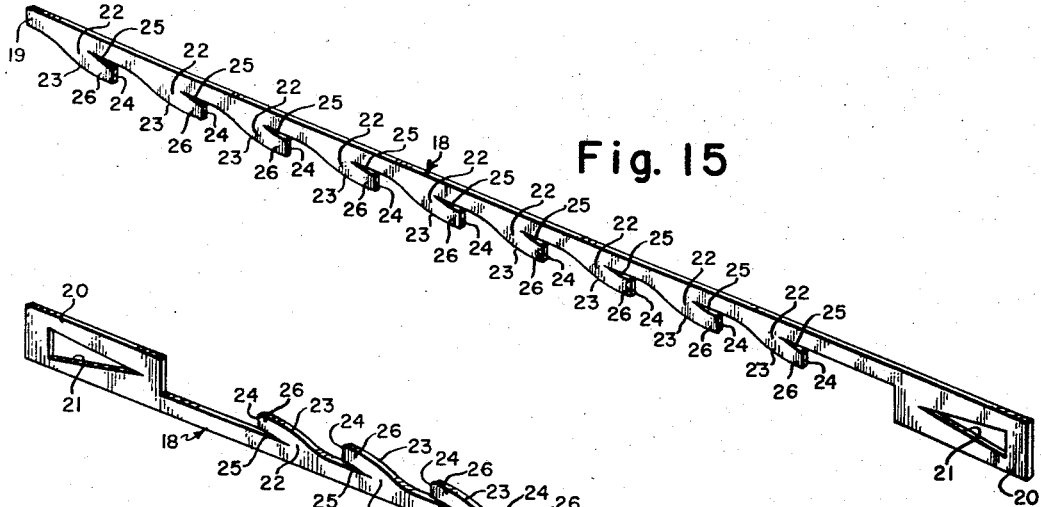

This invention relates to a flexible plastic tie device that is adjustable in a manner to be looped about articles, such as pipes and conduits, growing plants and trees and various other articles that need a supporting tie.

The invention comprises a molded plastic strap, having a rectangular head portion that is provided with a V-shaped opening for the slidable or adjustable engagement by the strap and with the strap being held in adjusted relation to the head by a plurality of teeth, extending from one side only of the strap and whereby the strap may be fed through the V-shaped opening to encircle the particular article to be supported and held against retracting the engagement of the teeth into the opening of the head.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

Figure 16:
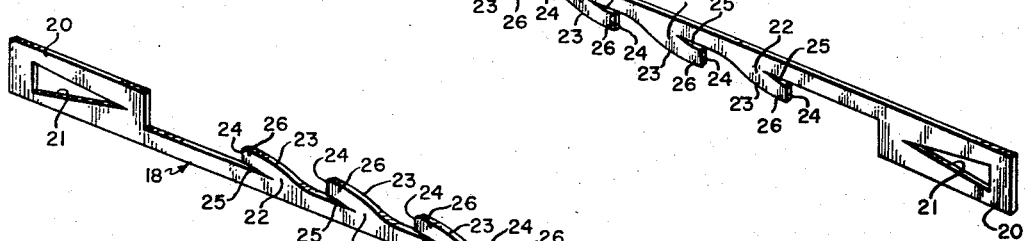
Figure 17:
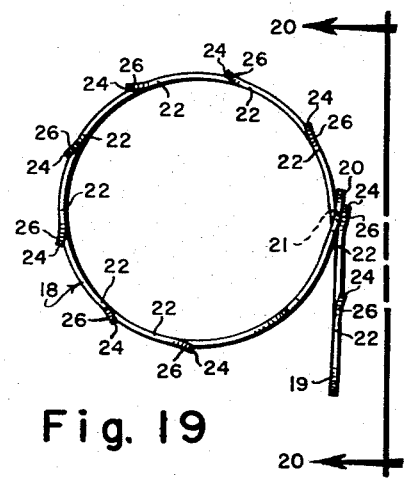
Figure 18:
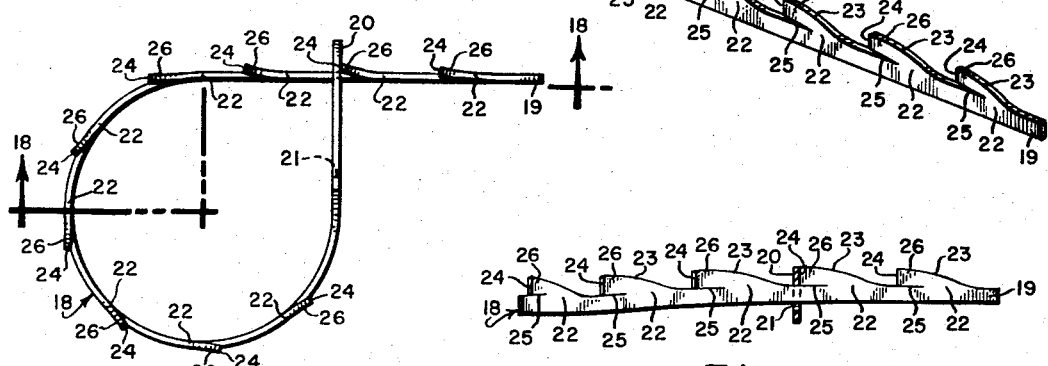
Figure 20:
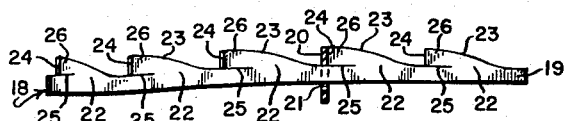
Figure 19:
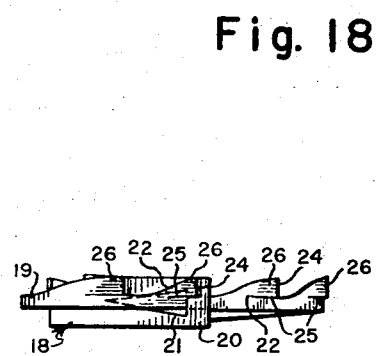

In the drawings:

FIGURE 1 is a perspective view of a tie device constructed in accordance with the invention, FIGURE 2 is a similar view from an opposite side of the device, FIGURE 3 is an end view in the adjusted position, FIGURE 4 is a transverse section taken substantially on line 4—4 of FIGURE 3, FIGURE 5 is a view similar to FIGURE 3 but showing the interlocking engagement of the teeth with respect to the head portion, FIGURE 6 is a section taken substantially on line 6—6 of FIGURE 5, FIGURE 7 is a section taken substantially on line 7—7 of FIGURE 5, FIGURE 8 is a perspective view of the tie device, showing the modified form of the invention, FIGURE 9 is a perspective view from the opposite side to that shown in FIGURE 8, FIGURE 10 is an end view of a strap in adjusted relation to the head portion, FIGURE 11 is a section taken substantially on line 11—11 of FIGURE 10, FIGURE 12 is an end view showing the strap in adjusted relation to the head portion, FIGURE 13 is a section taken substantially on line 13—13 of FIGURE 12, FIGURE 14 is a section taken substantially on line 14—14 of FIGURE 12, FIGURE 15 is a perspective view of the modified form of the invention, FIGURE 16 is a perspective view from the opposite side of FIGURE 15, FIGURE 17 is an end view showing the adjusted relationship of the strap with respect to the head portion, FIGURE 18 is a section taken along the lines 18—18 of FIGURE 17, FIGURE 19 is an end view showing the strap in adjusted relation to the head, and FIGURE 20 is a view taken along the line 20—20 of FIGURE 19.

In the drawings, reference being made specifically to FIGURES 1–7, the numeral 5 designates a molded plastic strap of desirable length, having an integral head portion 6, that is provided with a V-shaped notch 7. The strap 5 from one side is provided with a multiplicity of teeth 8. The strap and the head 6 are molded integrally from a suitable plastic, such as polyethylene, being flexible and bendable to embrace the particular article to be supported.

In the use of this form of the device, the strap 5 is bent around the article to be supported and with its free end 9 threaded through the V-shaped notch 7 and to partake of a looped tie device, such as shown in FIGURES 3 and 5. With the strap threaded through the slot 7, the extended end 9 is released and the strap has a normal tendency to twist causing at least one of the teeth 8 to hook against the outer side of the head 6, securely holding the strap in a supporting position with respect to the article to be supported such for instance, when the device is employed as a supporting tie for growing plants or the like. As shown in FIGURE 7, the strap 5 partakes of a twisting motion, permitted by the neck portion 8a of the teeth so that the teeth prevent the strap from being retracted from the head 6. The teeth 8 are curved upon their edges as indicated at 8', forming a shoulder 8b. The supporting device can be quickly and easily engaged about the edge of the stem of the plant and extended through the slot 7 so that the teeth 8 will lock the strap against a retracting movement.

Referring now to FIGURES 8–14 inclusive, there has been provided a strap 10, having a reduced leading end portion 11 and an integral head portion 12. The head portion 12 is also provided with a V-shaped opening 13 to which the strap is to be inserted. The teeth 14, are curved upon their edges as indicated at 15, forming a shoulder 16. Each tooth 14 is provided with a yieldable tongue 17 that is struck from the plastic of the strap 10 and normally biased outwardly, as clearly shown in the drawings.

In the use of this form of the device, the strap 10 is bent around the article to be supported, such as a plant with respect to a plant stake and the leading end 11 inserted through the slot 13 and pulled outwardly to a degree that causes the band, illustrated in FIGURES 10 and 12 to have fitment around the stem of a plant and the stake for supporting the plant and when released, the strap is prevented from retracting from the head by the engagement of the teeth and the tongues 17, holding the tie device in adjusted relationship to the article to be supported. As shown in FIGURE 13, the strap has a tendency to curl, causing adjacent tongues 17 to strike against the side of the head 12 and to prevent the retracting of the strap from its adjusted position. This device is also molded from suitable plastic, such as polyethylene, being suitably flexible and yieldable to embrace the article to be supported.

In FIGURES 15-20, there has been illustrated a further modified form of the tie device, embodying a strap 18, having a leading end 19 and a rectangular head 20. The head 20 is also provided with the V-shaped slot 21 for the reception of the strap 18. The strap 18 upon one side only is provided with a multiplicity of teeth 22, curved upon their edges indicated at 23 and with each tooth 22 at its free end being separated from the strap 18 by slitting or cutting the strap inwardly from the shoulder 24 of the teeth, as indicated at 25 and whereby the tongues 26, carried by each tooth is biased outwardly to a slight degree, shown particularly in FIGURES 16, 17 and 19.

In the use of this form of the device, the strap 18 is shaped around the particular article to be supported, extending the leading end 19 through the slot 21 where it will be held against retracting movement by the tongues 26. The tendency of the strap to twist, after inserting through the slot 21, causes the tongues 26 to function similar to a ratchet and pawl engagement, and securely holds the band, shown in FIGURES 17 and 19 to be effectively locked against a retracting movement of the strap. The strap in this form of the invention is also formed of a suitable plastic, such as polyethylene that is not effected by the weather and will securely hold the article, such as a plant for the duration of its growing period.

It will be apparent from the foregoing that the flexible tie device illustrated in these drawings is capable of being used in various ways, such as a holder for an identification tag, to hold groups of electric conductors or to support articles such as pipes. The device of this invention are stamped from a sheet of suitable plastic and are most economically formed and securely holds the articles, such as plants that are adapted to be tied to a ground stake. The device is simple in construction, is strong, durable and most effective as a tie device for relatively slender articles.

It is to be understood that the invention is not limited to the precise construction shown, but that changes are contemplated as readily fall within the spirit of the invention as shall be determined by the scope of the subjoined claims.

We claim:

1. A supporting band adapted to be quickly and securely fastened around an article to be supported, comprising an elongated strap of yieldable plastic having a head portion and a leading end portion, the head portion being provided with a V-shaped slot and with the strap upon one side only being provided with a plurality of teeth and with the strap and the teeth being adapted to be threaded through the V-shaped slot of the head, the teeth having shoulders and with the teeth from their shoulders being tapering the leading end of the strap so that when the leading end portion of the strap is threaded through the V-shaped slot in a direction to have its shoulders facing toward the connection between the strap and the head, said teeth will prevent the strap from being retracted accidentally from the head, the strap adjacent each of the teeth are stamped to provide laterally extending tongues that pass through the V-shaped slot of the head to spring outwardly to engage the outer side of the head and to prevent the cracking of the strap when connected to the head, the tongues being yieldable.

2. A supporting band adapted to be quickly and securely fastened around an article to be supported, comprising an elongated strap of yieldable plastic having a head portion and a leading end portion, the head portion being provided with a V-shaped slot and with the strap upon one side only being provided with a plurality of teeth and with the strap and the teeth being adapted to be threaded through the V-shaped slot of the head, the teeth having shoulders and with the teeth from their shoulders being tapering toward the leading end of the strap so that when the leading end portion of the strap is threaded through the V-shaped slot in a direction to have its shoulders facing toward the connection between the strap and the head, said teeth will prevent the strap from being retracted accidentally from the head, the strap is molded to form a plurality of laterally extending teeth and with the strap adjacent each tooth being inwardly cut to form yieldable tongues, each of the tongues being carried by the teeth and laterally projecting.

References Cited

UNITED STATES PATENTS

| | | | |
|---|---|---|---|
| 2,314,779 | 3/1943 | Fuhrmann | 24—16 X |
| 2,361,506 | 10/1944 | Smith | 24—17.1 X |
| 2,936,980 | 5/1950 | Rapata | 248—74 |
| 2,961,785 | 11/1960 | Toepfer | 24—16 X |
| 3,224,054 | 12/1965 | Ligé | 24—16 |
| 3,261,100 | 7/1966 | Quenot | 24—16 X |

JAMES L. JONES, Jr., *Primary Examiner.*